United States Patent
Illg et al.

(10) Patent No.: US 9,333,830 B2
(45) Date of Patent: May 10, 2016

(54) METHOD FOR OPERATING A STABILIZER ARRANGEMENT

(71) Applicant: Dr. Ing. h.c. F. Porsche Aktiengesellschaft, Stuttgart (DE)

(72) Inventors: Igor Illg, Renningen (DE); Thomas Mirwaldt, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/503,904

(22) Filed: Oct. 1, 2014

(65) Prior Publication Data
US 2015/0094909 A1    Apr. 2, 2015

(30) Foreign Application Priority Data
Oct. 2, 2013 (DE) .......................... 10 2013 110 953

(51) Int. Cl.
| | |
|---|---|
| B60G 21/00 | (2006.01) |
| B60G 21/055 | (2006.01) |
| B60G 17/015 | (2006.01) |
| B60G 17/016 | (2006.01) |
| B60G 17/02 | (2006.01) |

(52) U.S. Cl.
CPC ............ *B60G 21/055* (2013.01); *B60G 17/015* (2013.01); *B60G 17/0162* (2013.01); *B60G 17/025* (2013.01); *B60G 21/0555* (2013.01); B60G 2400/00 (2013.01); B60G 2400/0516 (2013.01); B60G 2400/10 (2013.01); B60G 2400/208 (2013.01); B60G 2400/252 (2013.01); B60G 2400/32 (2013.01); B60G 2800/9122 (2013.01)

(58) Field of Classification Search
CPC combination set(s) only.
See application file for complete search history.

(56) References Cited

U.S. PATENT DOCUMENTS

| | | | |
|---|---|---|---|
| 2005/0179221 A1* | 8/2005 | Yasui et al. | ................ 280/5.506 |
| 2005/0206100 A1 | 9/2005 | Ohta et al. | |
| 2007/0114733 A1* | 5/2007 | Yasui | .......................... 280/5.506 |
| 2007/0119644 A1* | 5/2007 | Yasui et al. | ................... 180/183 |

(Continued)

FOREIGN PATENT DOCUMENTS

| | | |
|---|---|---|
| DE | 112007000288 T5 | 1/2009 |
| DE | 102008000240 A1 | 8/2009 |

(Continued)

OTHER PUBLICATIONS

German Search Report, dated Mar. 17, 2014, corresponding to counterpart German Patent Application No. 10 2013 110 953.5 (with partial English translation).

*Primary Examiner* — Edward Pipala
(74) *Attorney, Agent, or Firm* — RatnerPrestia

(57) ABSTRACT

A method for operating a stabilizer arrangement which has two stabilizer modules and an actuator, wherein the stabilizer modules are arranged along an axle of a motor vehicle and are acted on by the actuator, wherein at least one kinematic variable of each wheel which is oriented in the vertical direction of the axle is determined, wherein by using a value of the at least one kinematic variable a value for at least one pilot control parameter is determined by a pilot control arrangement, which value is made available to a control cascade which includes an angle control module, a rotational speed control module and a power control module, wherein a value for a power control for operating the actuator is made available by the control cascade from the value for the pilot control parameter, which is dependent on the value of the kinematic variable.

9 Claims, 2 Drawing Sheets

(56) References Cited

U.S. PATENT DOCUMENTS

2009/0008887 A1    1/2009  Buma
2009/0091093 A1*   4/2009  Urababa et al. ............ 280/5.511
2010/0276896 A1   11/2010  Sano
2013/0307241 A1*  11/2013  Brown ................... 280/124.107

FOREIGN PATENT DOCUMENTS

| DE | 102010051807 A1 | 5/2012 |
| EP | 1577127 A2 | 9/2005 |
| EP | 1600313 A1 | 11/2005 |
| EP | 1925472 A2 | 5/2008 |

* cited by examiner

METHOD FOR OPERATING A STABILIZER ARRANGEMENT

CROSS-REFERENCE TO RELATED APPLICATIONS

This application claims priority under 35 U.S.C. §119 of German Patent Application No. 10 2013 110 953.5, filed Oct. 2, 2013, which is incorporated by reference herein in its entirety.

FIELD OF THE INVENTION

The present invention relates to a method and to a system for operating a stabilizer arrangement of an axle of a motor vehicle.

BACKGROUND OF THE INVENTION

A motor vehicle comprises at least two axles, wherein each axle is generally assigned two wheels. Furthermore, in each case one axle and the two wheels are assigned a so-called stabilizer which has at least one torsion body and limbs arranged thereon, wherein each limb is directly or indirectly connected to a wheel. The stabilizer can be used to damp and/or compensate fluctuations of the wheels in the vertical direction perpendicularly with respect to a direction of travel of the motor vehicle and perpendicularly with respect to the axle, and therefore to achieve rolling stabilization for the motor vehicle.

Document DE 10 2008 000 240 A1, which is incorporated by reference herein, describes a method for operating a motor vehicle which has two axles with wheels mounted in a sprung fashion thereon, wherein each axle is assigned an electromechanical stabilizer. For this purpose, wheel movements of the individual wheels are detected and fed to a control, as a result of which an electric motor of the stabilizer is controlled in such a way that spring compression movements on one side are prevented from being copied on to another side of the axle.

DE 10 2010 051 807 A1, which is incorporated by reference herein, describes a rolling stabilization device for a motor vehicle comprising a stabilizer which is assigned two wheels of an axle of the motor vehicle and is divided into two stabilizer halves, an actuator which is capable of rotating the two stabilizer halves with respect to one another, and a control device which is designed to operate the actuator as a function of driving state parameters, at least in a first operating state of the motor vehicle, in such a way that a rolling movement of the vehicle is counteracted by a torque transmission between the two stabilizer halves.

A control device for a stabilizer of a motor vehicle is described in document EP 1 577 127 A2, which is incorporated by reference herein. Here, the stabilizer comprises a pair of stabilizer rods which are arranged between two wheels of an axle, and an actuator which is arranged between the stabilizer rods and which comprises an electric motor and a mechanism for reducing the speed. A desired torque for the electric motor is calculated on the basis of behavior of the motor vehicle and of steering operations of a driver. Furthermore, a torque is estimated for each stabilizer rod. The electric motor is controlled as a result of a comparison of the desired torque with the estimated torque.

A stabilizer arrangement which is known from document EP 1 925 472 A2, which is incorporated by reference herein, comprises a two-part stabilizer with in each case one radius link which runs in the longitudinal direction of the vehicle and whose stabilizer sections execute a rotational relative movement with respect to one another. The stabilizer sections are operatively connected to an adjustable torque generating device which has such high control dynamics that the stabilizer arrangement applies an adapted opposing torque to a torque acting on the stabilizer arrangement, even when a torsional section inside the stabilizer arrangement is dispensed with.

Against this background, a method and a system having the features of the independent patent claims are presented.

SUMMARY OF THE INVENTION

The method according to aspects of the invention is designed to operate at least one usually electromechanic stabilizer arrangement which has two stabilizer modules and an actuator, wherein the stabilizer modules are arranged along an axle of a motor vehicle and are acted on by the actuator, for example are rotated relative to one another. Furthermore, the axle is assigned a plurality of wheels, generally two. Each wheel is generally assigned a stabilizer module, wherein each wheel can be arranged on the stabilizer module, i.e. can be connected directly or indirectly to the stabilizer module.

In the method, at least one kinematic variable of each wheel which is oriented in the vertical direction of the axle is determined. By using a value of the at least one kinematic variable a value for at least one pilot control parameter is determined by a pilot control arrangement, which value is made available to a control cascade which comprises an angle control module, a rotational speed control module and a power control module which are connected in series. A value for a power control for operating the actuator is made available by means of the control cascade from the value for the at least one pilot control parameter, which is dependent on the value of the at least one kinematic variable.

Within the scope of the method, a value for a setpoint angle for the actuator is determined by a torque pilot control module of the pilot control arrangement from a value for a setpoint torque and detected values for a vertical position as the at least one kinematic variable of the wheels.

Furthermore, a value for a setpoint rotational speed for the actuator is determined by the angle control module from a value for a setpoint angle, for example from the value of the setpoint angle which has already been determined in the course of the method, and a detected value for an actual angle of the actuator, generally the actual angle of the motor and/or transmission of the actuator.

A value for a rotational speed pilot control is determined as the at least one pilot control parameter for the actuator by means of a rotational speed pilot control module of the pilot control arrangement from detected values for a vertical speed as the at least one kinematic variable of the wheels, from a detected value for a vehicle body rolling rate and a value for a setpoint angle and/or the value which is determined as described above for the setpoint angle of the actuator.

In a further refinement of the method, a value for a setpoint current for the actuator is determined by the rotational speed control module from a value for a setpoint rotational speed of the actuator which can be determined in advance in the method, a value for a rotational speed pilot control as the at least one pilot control parameter of the actuator and a value for an actual rotational speed of the actuator.

A value for a pilot control is determined as the at least one pilot control parameter for the actuator by a power pilot control module of the pilot control arrangement from detected values for vertical acceleration as the at least one kinematic variable of the wheels, from a detected value for vehicle body rolling acceleration, from a value for a setpoint angle of the actuator and from a value for a setpoint rotational speed of the actuator, wherein the two last-mentioned values may also have already been determined within the scope of the method.

A value for the power control for the actuator is determined by the power control module from a detected value for a setpoint current of the actuator, a value for a power pilot control as the at least one pilot control parameter of the actuator, wherein this value may have already been determined in the method, and a value for an actual current of the actuator.

Furthermore, a power electronics system makes available, from a value for the power control of the actuator which has generally already been determined in the method, a value for an actual current which is applied to the motor of the actuator, as a result of which a value for an actual torque of the actuator is made available for a transmission of the actuator. During operation of the power electronics system as well as the motor and the transmission, values for the actual angle as well as for the actual rotational speed of the actuator, i.e. of the motor and/or of the transmission, are made available in the course of operation and are made available to the angle control module as well as to the rotational speed control module. The value for the actual current is made available to the power control module.

The method can be carried out simultaneously for a plurality of stabilizer arrangements; there is provision that in each case a stabilizer arrangement is assigned to an axle of the motor vehicle. In this context, a value for the power control is made available for each actuator of each stabilizer arrangement, for operating the respective actuator, wherein values for the power control for operating the actuators are determined comprehensively for the stabilizer arrangement. As a result, inter alia vertical kinematic variables of all the wheels are simultaneously and comprehensively taken into account.

All the components of the system, i.e. modules of the control cascade and pilot control arrangement, of the stabilizer arrangement, inter alia of the actuator, which have been described above interact during the execution of the method, wherein values for the kinematic variables, for the pilot control parameters and for the operating parameters can be processed and interchanged by the components. In this context, some of the values can be dependent on one another.

Generally, in each case values for the at least one vertical kinematic variable, here for the vertical position, the vertical speed and the vertical acceleration, are detected simultaneously for all the wheels of the axle, i.e. usually for the two wheels of the axle. In one embodiment it is possible to compare the two values for one of these kinematic variables which have been detected at one time and therefore to take into account a relative position and/or movement of the wheels with respect to one another, in addition to their vertical position and/or movement relative to the axle.

The system according to aspects of the invention which is designed to execute the method has a pilot control arrangement and a control cascade. The pilot control arrangement is designed to use a value of the at least one kinematic variable to determine a value for at least one pilot control parameter and to make it available to the control cascade. The control cascade is designed to make available a value for a power control for operating the actuator, from the value for the at least one pilot control parameter which is dependent on the value of the at least one kinematic variable.

The modules and therefore components of the control cascade, i.e. the angle control module, the rotational speed control module and the power control module, are connected in series in accordance with this sequence.

The system has at least one control unit which is designed to control the at least one stabilizer arrangement, i.e. to perform open-loop and/or closed-loop control thereof. The at least one control unit has the control cascade and the pilot control arrangement and is designed to control at least one step of the method.

In one embodiment, a power electronics system of the at least one control unit is connected downstream of the power control module, wherein the motor and the transmission of the actuator are in turn connected downstream of the power electronics system.

The power electronics system forms, with the power control module, a loop via which values of at least one operating parameter, for example the actual current, of the power electronics system are to be fed back to the power control module from the power electronics system. The motor forms, with the rotational speed control module, a loop via which values of at least one operating parameter, of the actual rotational speed here, of the motor are to be fed back to the rotational speed control module from the motor. Furthermore, the motor forms, with the angle control module, a loop via which values of at least one operating parameter, for example the actual angle, of the motor are to be fed back to the angle control module from the motor. Accordingly, the power electronics system has a feedback connection to the power control module, and the motor has a feedback connection to the rotational speed control module as well as the angle control module. The values of the operating parameters which are detected by the power electronics system and the motor in the course of operation are also taken into account by the specified modules of the control cascade for the determination of the values for the setpoint rotational speed and the setpoint current.

The pilot control arrangement comprises as modules a torque pilot control module, a rotational speed pilot control module and a power pilot control module, which determine the pilot control parameters taking into account detected operating parameters, here the at least one vertical variable and the vehicle body rolling rate and the vehicle body angular acceleration.

In one embodiment of the system, the torque pilot control module is connected upstream of the angle control module. Furthermore, the rotational speed pilot control module is connected in parallel with the angle control module and in series between the torque pilot control module and the rotational speed control module. The power pilot control module is connected in parallel with the rotational speed control module and in series between the angle control module and the power control module.

The system can also be designed to operate a plurality of stabilizer arrangements of the motor vehicle, wherein in each case a stabilizer arrangement is assigned to an axle of the motor vehicle, and each stabilizer arrangement is assigned a stabilizer-arrangement-specific control unit. In this case, the system has a superordinate control unit which is designed to control the stabilizer-arrangement-specific control units.

With the method and the system it is possible to implement a concept for implementing an electromechanical rolling stabilization of a motor vehicle, usually for at least one axle of the motor vehicle, wherein for this purpose it is possible to dispense with use of an otherwise customary torque sensor.

During the implementation of the electromechanical rolling stabilization within the scope of the method, the torque of at least one stabilizer arrangement which is assigned to an axle of the motor vehicle is influenced with the actuator, which comprises the electric motor and the transmission, by means of active actuating interventions. In one embodiment, each axle of the motor vehicle is assigned a stabilizer arrangement. In this context, all the axle-specific stabilizer arrangements can be controlled via the central, superordinate control unit.

In order to ensure that a setpoint torque which is supplied by the actuator of a stabilizer arrangement corresponds to an actual torque, according to the prior art a sensor which is embodied as a torque sensor has hitherto been used to detect the actual torque. The actual torque which is measured in the process is then fed back with an information-processing control unit using software logic in order to actuate at least one output stage of the stabilizer arrangement.

Within the scope of the method, a direct measurement of the actual torque and feedback of a measurement result are dispensed with. Instead, pilot control of the requested torque, i.e. of the setpoint torque, of the actuator or of an actuator, is implemented, wherein with this setpoint torque a value is made available for the power control, on which in turn values for the actual current, for the actual rotational speed and for the actual angle of the motor and for the actual torque of the actuator are based.

In this context, pilot control for the setpoint torque is determined with the control cascade which comprises as components a subordinate angle control circuit or the angle control module, a subordinate rotational speed control circuit or the rotational speed control module and a subordinate power control circuit or the power control module. The necessary actual torque which is to be made available with the method is set by means of a direct rotation of the motor of the actuator and/or of the stabilizer arrangement.

In/one refinement, for the pilot control of the setpoint torque an antiphase change of vertically oriented vertical position is included of the wheels relative to the axles. This involves a vertical position of a wheel about a vertical kinematic variable of this wheel, which is oriented perpendicularly with respect to the axle and perpendicularly with respect to a direction of travel of the motor vehicle. Changes over time or derivatives of the vertical position are used as further vertical kinematic variables, i.e. a vertical speed of the wheel relative to the axle is used as a first derivative and a vertical acceleration of the wheel relative to the axle is used as a second derivative.

In this context, an angle about which the stabilizer arrangement of an axle is to be rotated, vertical speeds of the two wheels relative to the axle and a vehicle body rolling rate are fed as operating parameters to the control cascade by the modules of the pilot control arrangement as pilot control parameters, as a result of which the control cascade is supported dynamically. A signal for an actual rotational speed which is calculated by the control cascade, about which actual rotational speed the actuator and/or the stabilizer arrangement are/is to be rotated, is fed directly to the rotational speed control module of the control cascade by the motor via the loop which is provided for this purpose. Furthermore, the angle or rotational angle, the rotational speed, the vertical wheel acceleration and the vehicle body rolling acceleration are fed to the control cascade as pilot control parameters, as a result of which the control cascade is supported dynamically. A signal which is calculated in this process for the value of the actual current is fed directly to the power control module of the control cascade by the power electronics system. At least one operating parameter, for example the at least one vertical kinematic variable of the wheels, is usually used to describe a state of the motor vehicle and/or a state of the actuator. As a result, all the operating parameters can also be used to describe the state of the motor vehicle and/or the state of the actuator.

At least one step of the method is controlled with the control unit as a component of the system according to aspects of the invention. This control unit comprises the control cascade and/or is designed to implement functions of the control cascade. If this control unit for controlling the actuator is installed outside the actuator and therefore not directly in and/or on the actuator, at least one signal line and/or power line is provided as an electrical connection between the actuator and the control unit.

By dispensing with the measurement of the torque with a torque sensor, which is otherwise assigned to the actuator and requires a defined installation space in an interior space of the actuator, the system is significantly simplified, as a result, there can be a saving in mass and costs and installation space can be reduced. Furthermore, a sensor signal of the torque sensor no longer has to be evaluated in the control unit, with the result that it is possible to dispense with components of the control unit which are necessary for this purpose.

Further advantages and refinements of the invention are found in the description and the accompanying drawings.

Of course, the features which are mentioned above and which are still to be explained below can be used not only in the respectively specified combination but also in other combinations or alone without departing from the scope of the present invention.

BRIEF DESCRIPTION OF THE DRAWINGS

The figures are described in an inter-related and comprehensive fashion and identical reference numerals describe identical components.

DETAILED DESCRIPTION OF THE INVENTION

Figure 1:
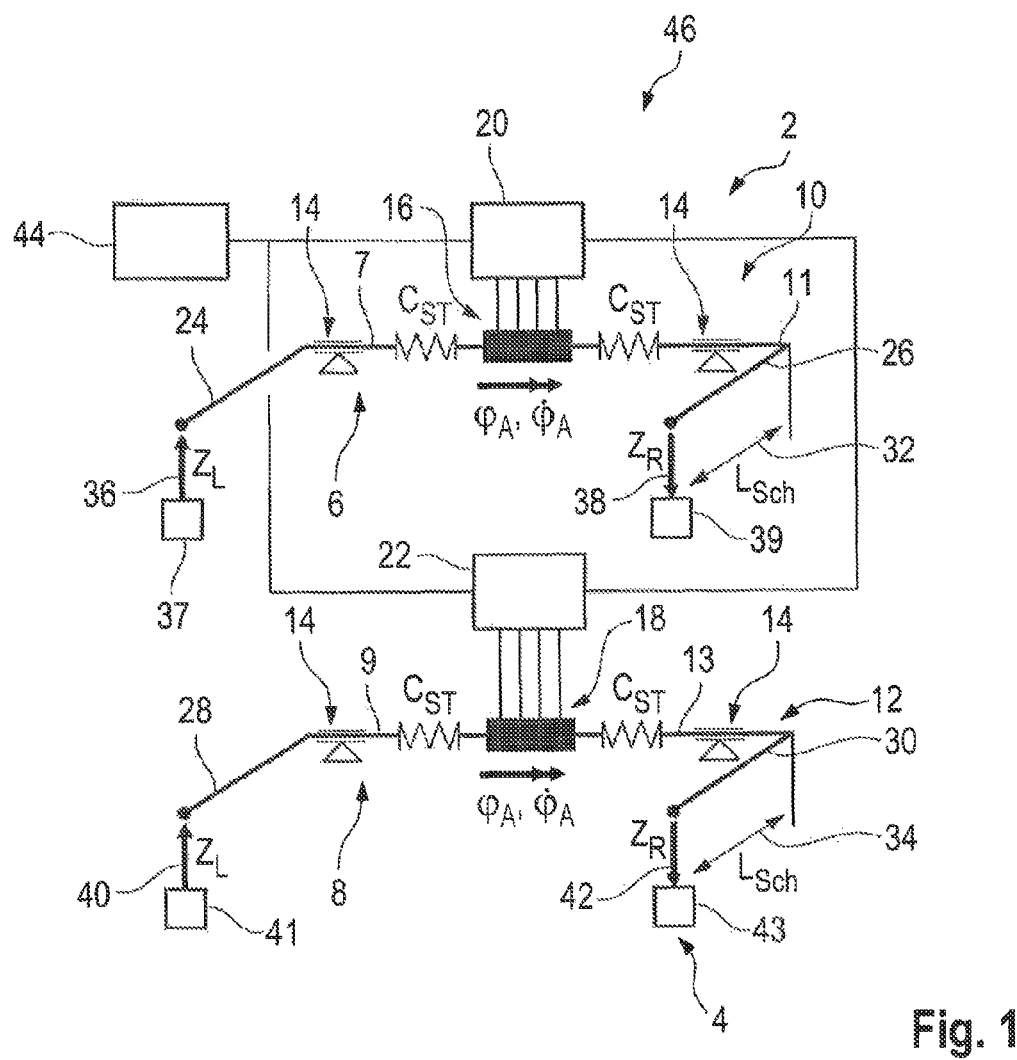
FIG. 1 shows a schematic illustration of an embodiment of the system according to aspects of the invention and two embodiments of a stabilizer arrangement when an embodiment of the method according to aspects of the invention is being carried out.

FIG. 1 shows a schematic illustration of the first and second embodiments of the stabilizer arrangement 2, 4 according to aspects of the invention, wherein the first stabilizer arrangement 2 is to be connected to a first axle, which is not illustrated here and is embodied as a front axle, of a motor vehicle. The second stabilizer arrangement 4 is to be connected to a second axle, which is not illustrated here and is embodied as a rear axle, of the motor vehicle.

Each stabilizer arrangement 2, 4 comprises a first stabilizer module 6, 8 and a second stabilizer module 10, 12, wherein each stabilizer module 6, 8, 10, 12 can also be referred to as a stabilizer half and has a torsion body 7, 9, 11, 13 with a torsional rigidity $c_{St}$. In this context, the torsion bodies 7, 9, 11, 13 are each oriented at least in certain sections or, if appropriate, completely in parallel with the respective axles of the motor vehicle. Generally, values for the torsional rigidity $c_{St}$ of the torsion bodies 7, 9, 11, 13 of the two stabilizer modules 6, 8, 10, 12 of a respective stabilizer arrangement 2, 4 for one axle in each case are of equal size since the stabilizer modules 6, 8, 10, 12 of the stabilizer arrangement 2, 4 of a respective axle are embodied in the same way.

In addition, each torsion body 7, 9, 11, 13 is connected via an attachment element 14, embodied for example as a bearing, to that axle to which the stabilizer module 6, 8, 10, 12 is assigned. The torsion bodies 7, 9, 11, 13 of the stabilizer modules 6, 8, 10, 12 can be embodied in the form of tubes or rods and can be linear in shape at least in certain sections, wherein each torsion body 7, 9, 11, 13 and accordingly each stabilizer module 6, 8, 10, 12 can have at least one bent section in one refinement. Each torsion body 7, 9, 11, 13 is surrounded here at one point by the attachment element 14 which is assigned thereto and which is in turn attached to the respective axle.

Each stabilizer arrangement 2, 4 has as a further component an actuator 16, 18 or actuator via which the two torsion bodies 7, 9, 11, 13 of the respective stabilizer modules 6, 8, 10, 12 are connected and coupled to one another mechanically. Each actuator 16, 18 is embodied here as an electric motor with a transmission, during the operation of which the two torsion bodies 7, 9, 11, 13 which are coupled via said actuator 16, 18, and therefore the stabilizer modules 6, 8, 10, 12, can usually be rotated relative to one another in a coaxial direction of the two torsion bodies 7, 9, 11, 13 and/or of the axle. In this context, each actuator 16, 18 has an actual rotation about an angle $\phi_A$ as an operating parameter, furthermore, within the scope of the presented method a change in the angle $\phi_A$ over time and therefore an angular speed $(d\phi_A/dt)$ is also to be taken into account as an operating parameter of the actual rotation. In one embodiment, an actual torque of the actuator 16, 18 is determined from the angle $\phi_A$ and/or from the angular speed $(d\phi_A/dt)$ of the actual rotation of the actuator 16, 18.

Each stabilizer arrangement 2, 4 has a control unit 20, 22 which is connected to the actuator 16, 18 of the respective stabilizer arrangement 2, 4 via at least one power line and at least one signal line, for example a CAN and/or Flexray signal line, and is designed to control a function of the actuator 16, 18 which is assigned thereto, and therefore to perform open- and/or closed-loop control thereof, as a result of which the angle $\phi_A$ and the angular speed $(d\phi_A/dt)$ of the actual rotation are set.

In addition, FIG. 1 shows, as further components of the stabilizer modules 6, 8, 10, 12, limbs 24, 26, 28, 30, wherein in each case one of these limbs 24, 26, 28, 30 is arranged at one end of a torsion body 7, 9, 11, 13 of a stabilizer module 6, 8, 10, 12. A wheel suspension for a wheel is arranged at one end of each limb 24, 26, 28, 30. Each limb 24, 26, 28, 30 is oriented at an acute angle of, for example, at maximum approximately 90° with respect to a longitudinal axis of the torsion body 7, 9, 11, 13 and has a length $L_{Sch}$ which is indicated by a double arrow 32, 34.

The wheels (not illustrated) move during an operation of the vehicle not only in the horizontal direction of travel but also in the vertical direction, perpendicularly with respect to the direction of travel, wherein a vertical distance of in each case one wheel relative to the torsion bodies 7, 9, 11, 13 of the stabilizer modules 6, 8, 10, 12 of the stabilizer arrangement 2, 4 is changed. In this respect, so-called vertical positions $z_L$, $z_R$ of the wheels are indicated as vertically oriented kinematic variables of the wheels of the motor vehicle in FIG. 1 by arrows 36, 38, 40, 42. In this context, a wheel which is attached at front left to the front axle has a front left vertical position $z_L$ (arrow 36), and a wheel which is attached at front right to the front axle has a front right vertical position $z_R$ (arrow 38). Correspondingly, a wheel which is attached at rear left to the rear axle has a rear left vertical position $z_L$ (arrow 40), and a wheel which is attached at rear right to the rear axle has a rear right vertical position $z_R$ (arrow 42).

Furthermore, each wheel is assigned a distance sensor 37, 39, 41, 43, specifically the front left wheel is assigned a first distance sensor 37, the front right wheel is assigned a second distance sensor 39, the rear left wheel is assigned a third distance sensor 41 and the rear right wheel is assigned a fourth distance sensor 43. A vertical distance of the respective wheel from the torsion bodies 7, 9, 11, 13 of the stabilizer arrangement 2, 4, and therefore the vertical position $z_L$, $z_R$ of this wheel, can be detected with the respective distance sensor 37, 39, 41, 43. The vertical speed and acceleration are derived from the change in the vertical position $z_L$, $z_R$ of the wheel over time with the control unit 20, 22, for example by means of calculation.

Both control units 20, 22, shown here, of the two stabilizer arrangements 2, 4 are connected via signal lines to a central control unit 44 with which the control units 20, 22 which are assigned to the stabilizer arrangements 2, 4 and/or the stabilizer arrangements 2, 4 can be controlled and therefore open-loop and/or closed-loop control can be performed.

When the embodiment of the method is executed, in addition to the operating parameters already mentioned for the angles $\phi_A$ and angular speeds $(d\phi_A/dt)$ of the actual rotation of the actuators 16, 18, the torsional rigidity $c_{St}$ of the stabilizer modules 6, 8, 10, 12, the length $L_{Sch}$ of the limbs 24, 26, 28, 30 and the relative vertical positions $z_L$, $z_R$ of the wheels; vertical speeds $(dz_L/dt)$, $(dz_R/dt)$ of the wheels as well as vertical accelerations $(d^2z_L/dt^2)$, $(d^2z_R/dt^2)$ of the wheels are taken into account as further vertical kinematic variables.

An angle $\Delta\phi_{HS}$ for rotation of in each case one stabilizer arrangement 2, 4 is calculated from these operating parameters according to the formula (1) below, wherein this angle $\Delta\phi_{HS}$ is dependent on two vertical positions $z_L$, $z_R$ of the two wheels which are connected to a stabilizer arrangement 2, 4, and on the respective length $L_{Sch}$ of the limbs 24, 26, 28, 30 which are respectively arranged on the stabilizer modules 6, 8, 10, 12, wherein the lengths $L_{Sch}$ of the limbs 24, 26, 28, 30 of a stabilizer arrangement 2, 4 are the same here:

$$\Delta\phi_{HS}=(z_L-z_R)/L_{Sch} \tag{1}$$

Furthermore, the following is obtained for an actual torque $M_A$ of an actuator 16, 18 which is dependent on the angle $\Delta\phi_{HS}$ for the rotation of the stabilizer arrangement 2, 4, on the angle $\phi_A$ of the actual rotation of the actuator 16, 18, and on the torsional rigidity $c_{St}$, according to the formula (2):

$$M_A=(\phi_A-\Delta\phi_{HS})*c_{St} \tag{2}$$

Figure 2:
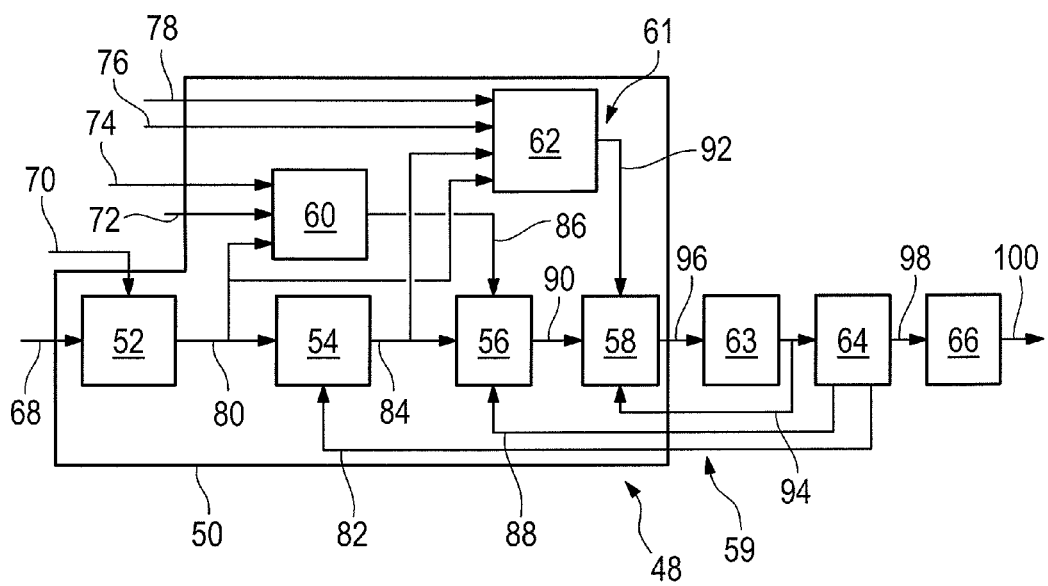
FIG. 2 shows a schematic illustration of details of the embodiments of the system present in FIG. 1 and of one of the stabilizer arrangements when the embodiment of the method according to aspects of the invention is being carried out.

At least one of the represented control units 20, 22, 44 is embodied as a component of a system 46 according to aspects of the invention. Details of a control unit 48 of this system 46 which is embodied as part of at least one of the control units 20, 22 are illustrated schematically in FIG. 2.

Here, each of the represented control units 20, 22, which is assigned to one of the actuators 16, 18 and therefore to a stabilizer arrangement 2, 4, comprises such a control unit 48 with a control module 50 (eAWS actuator control) for the actuator 16, 18. This control module 50 comprises a torque pilot control module 52, an angle control module 54, a rotational speed control module 56 and a power control module 58, which are connected in series one behind the other according to the embodiment of the system illustrated in FIG. 1, wherein at least the angle control module 54, the rotational speed control module 56 and the power control module 58 form modules of a control cascade 59.

Furthermore, the control module 50 comprises a rotational speed pilot control module 60 and a power pilot control module 62 which are both connected in parallel one behind the other with respect to the modules of the control cascade 59 which are connected in series. The torque pilot control module 52, the rotational speed pilot control module 60 and the power pilot control module 62 are embodied as modules of a pilot control arrangement 61 which, as further explained below, are made available as operating parameters, inter alia values for vertical kinematic variables of the wheels, to one axle in each case. Values for the pilot control parameters are calculated from these values for the operating parameters and therefore for the kinematic variables by the modules of the pilot control arrangement 61, i.e. the torque pilot control module 52, the rotational speed pilot control module 60 and the power pilot control module 62, and are made available to the modules of the control cascade 59.

A power electronics system 63 with an output stage is connected downstream of the power control module 58 and therefore also the control module 50 of the control unit 48 (shown in FIG. 2) for the actuator 16 or 18 as a further component of the control unit 20 or 22. Furthermore, an electric motor 64 (eAWS motor) and a transmission 66 (eAWS transmission) are connected downstream of the power electronics system as components of the actuator 16 or 18, said components being controlled with the control unit 48 and the power electronics system 63 of the control unit 20 or 22. In this context, the power electronics system 63 forms, with the power control module 58, a loop via which values of at least one operating parameter can be fed back to the power control module 58 by the power electronics system 63. Furthermore, the motor 64 of the actuator 16 or 18 forms, both with the angle control module 54 and with the rotational speed control module 56, in each case a loop via which values of at least one current operating parameter of the motor 64, generally detected by a sensor system of the motor 64 during the course of operation can be respectively fed to the angle control module 54 and to the rotational speed control module 56. Accordingly, depending on the definition, the power electronics system 63 and the motor 64 or at least the sensor system of the motor 64 can also be provided and/or embodied as components and/or modules of the control cascade 59.

When the method is executed, a desired value for a setpoint torque 68 and values for vertical positions 70 of the two wheels, i.e. a value for the vertical position 70 of the left wheel and a value for the vertical position 70 of the right wheel of an axle are made available as kinematic variables to the torque pilot control module 52, on which basis a difference between the values of the vertical positions 70 of the two wheels can also be calculated and used in accordance with the formula (1) within the scope of the method. The values for the vertical positions 70 are determined by the distance sensors 37, 39, 41, 43 for determining a relative vertical distance of a wheel from the torsion body 7, 9, 11, 13.

Furthermore, values for vertical speeds 72 of the wheels and a detected value for a vehicle body rolling rate 74 of the stabilizer arrangement 2 or 4 are made available to the rotational speed pilot control module 60. Values for vertical accelerations 76 of the wheels and a detected value for a vehicle body rolling acceleration 78 of the stabilizer arrangement 2 or 4 are made available to the power pilot control module 62. Values for the vertical speeds and/or accelerations of the wheels can also be detected by sensors or derived from the values for the vertical positions 70. Furthermore, values for a difference between the vertical speeds and/or accelerations can be determined and used to execute the method.

The torque pilot control module 52 is designed to calculate from the values for the setpoint torque 68 and the vertical position 70 of each of the two wheels a value for a setpoint angle 80 as an operating parameter and/or pilot control parameter which the actuator 16 or 18 has to assume. The calculated value for the setpoint angle 80 is therefore dependent on the values processed by the torque pilot control module 52 of the pilot control arrangement 61 for the setpoint torque 68 and the vertical position 70 as a vertical kinematic variable.

The respective two stabilizer modules 6, 8, 10, 12 of one axle are to be rotated relative to one another about this requested setpoint angle 80 by the respective actuator 20 or 22. The calculated value for the setpoint angle 80 is transmitted to the angle control module 54, the rotational speed pilot control module 60 and the power pilot control module 62.

Furthermore, in addition to the value for the setpoint angle 80 of the motor 64, a current value of an actual angle 82 by which the actuator 16 or 18 is rotated and/or by which the respective two stabilizer modules 6, 8, 10, 12 are rotated relative to one another by means of the actuator 16 or 18 is made available as an operating parameter to the angle control module 54. This value of the actual angle 82 is made available by the motor 64. The actual angle 82 and the setpoint angle 80 correspond to the angle $\Delta\phi_{HS}$ which is to be calculated according to formula (1). The angle control module 54 is designed to calculate from the value for the setpoint angle 80 and the value of the actual angle 82 a value for a setpoint rotational speed 84 with which the actuator 16 or 18 has to rotate and/or with which the respective two stabilizer modules 6, 8, 10, 12 are to be rotated relative to one another by means of the actuator 16 or 18. In this context the angle control module 54 is designed to adapt the value of the actual angle 82 to the value of the setpoint angle 80, which is possible by controlling the setpoint rotational speed 84. The value for the setpoint rotational speed 84 is transmitted both to the rotational speed control module 56 and to the power pilot control module 62.

Simultaneously, a value for a rotational speed pilot control 86 is calculated as a pilot control parameter of the actuator 20, 22 from the value for the setpoint angle 80, the values for the vertical speeds 72 of the wheels and the value for the vehicle body rolling rate 74, and is transmitted to the rotational speed control module 56. The value for the rotational speed pilot control 86 is therefore dependent, inter alia, on the values processed by the rotational speed pilot control module 60 of the pilot control arrangement 61 for the vehicle body rolling rate 74 and the vertical speed 72 of the wheels as a vertical kinematic variable.

In addition to the value for the setpoint rotational speed 84 as well as the value for the rotational speed pilot control 86 as pilot control parameters a current value for an actual rotational speed 88 is also made available to the rotational speed control module 56 as an operating parameter of the actuator 16 or 18 which is also determined by the electric motor 64. From these specified values, a value for a setpoint current 90 for operating and/or acting on the actuator 16 or 18, i.e. the electric motor 64 and/or the transmission 66 of the actuator 16 or 18, i.e. the electric motor 64 and/or the transmission 66 of the actuator 16 or 18, is calculated by the rotational speed control module 56. Here, the actual rotational speed 88 is to be adapted to the setpoint rotational speed 84, which is possible by controlling the setpoint current 90.

The power pilot control module 62 is designed to determine, from the calculated values for the setpoint angle 80 and the setpoint rotational speed 84 as well as from the values for the vertical accelerations 76 of the wheels and of the vehicle body rolling acceleration 78, a value for a power pilot control 92 as a pilot control parameter, which is dependent, inter alia, on the values processed by the power pilot control module 62 of the pilot control arrangement 61 for the vehicle body rolling acceleration 78 and the vertical acceleration 76 of the wheels as a vertical kinematic variable, and to transmit said value to the power control module 58.

A value for a power control 96 is calculated by the power control module 58 from this value for the power pilot control 92, the value for the setpoint current 90 and a current value for an actual current 94 as an operating parameter, which is transmitted to the power control module 58 by the power electronics system 63 with the output stage, and is transmitted to the power electronics system 63, wherein here the actual current 84 is adapted to the setpoint current 90.

On the basis of this value for the power control 96, the power electronics system 93 makes available a value for the actual current 94 with which the electric current 64 is actuated and/or acted on by the power electronics system 63, as a result of which the motor 64 is rotated. This value for the actual current 94, which is determined by the power electronics system 63 in the course of operation is also fed back to the power control module 58, which has a feedback connection to the power electronics system 63, and said value is therefore made available thereto.

A rotation 98 of the motor 64 which results from the value for the actual current 94 acts on the transmission 66, as a result of which a value for an actual torque 100 of the stabilizer arrangement 2 or 4 is made available, by means of which the respective two stabilizer modules 6, 8, 10, 12 of an axle are rotated relative to one another by means of the actuator 16 or 18, i.e. the electric motor 64 and the transmission 66 as components of the actuator 16 or 18. This actual torque 100 corresponds to the actual torque $M_A$ which is to be calculated according to formula (2). In this context, values for the actual angle 82 and the actual rotational speed 88 are also determined as operating parameters by the motor 64 in the course of operation, wherein the value for the actual angle 82 is fed back to the angle control module 54, which has a feedback connection to the motor 64, and said value is therefore made available thereto, and the value for the actual rotational speed 88 is fed back to the rotational speed control module 56, which also has a feedback connection to the motor 64, and said value is therefore made available thereto.

What is claimed is:

1. A method for operating at least one stabilizer arrangement which has two stabilizer modules arranged along an axle of a motor vehicle and are acted on by an actuator, the method comprising the steps of:
   determining at least one kinematic variable of each wheel of the axle, which is oriented in the vertical direction of the axle, the at least one kinematic variable being based upon a vertical position of the wheel with respect to the axle,
   determining a value for at least one pilot control parameter by a pilot control arrangement using a value of the at least one kinematic variable,
   supplying the value to a control cascade which comprises an angle control module, a rotational speed control module and a power control module,
   supplying a value for a power control for operating the actuator by the control cascade from the value for the at least one pilot control parameter, which is dependent on the value of the at least one kinematic variable; and
   operating the actuator based upon the value for power control.

2. The method as claimed in claim 1, further comprising determining a value for a setpoint angle for the actuator based upon a torque pilot control module of the pilot control arrangement from a value for a setpoint torque and values for the vertical position as the at least one kinematic variable of the wheels of the axle.

3. The method as claimed in claim 1, further comprising determining a value for a setpoint rotational speed for the actuator based upon the angle control module from a value for a setpoint angle for the actuator and a value for an actual angle of the actuator.

4. The method as claimed in claim 1, further comprising determining a value for a rotational speed pilot control as the at least one pilot control parameter for the actuator based upon a rotational speed pilot control module of the pilot control arrangement from values for a vertical speed as the at least one kinematic variable of the wheels, from a value for a vehicle body rolling rate and a value for a setpoint angle of the actuator.

5. The method as claimed in claim 1, further comprising determining a value for a setpoint current for the actuator based upon the rotational speed control module from a value for a setpoint rotational speed of the actuator, a value for a rotational speed pilot control, as the at least one pilot control parameter of the actuator, and a value for an actual rotational speed for the actuator.

6. The method as claimed in claim 1, further comprising determining a value for a power pilot control as the at least one pilot control parameter for the actuator based upon a power pilot control module of the pilot control arrangement from values for vertical acceleration as the at least one kinematic variable of the wheels, a value for vehicle body rolling acceleration, a value for a setpoint angle for the actuator and a value for a setpoint rotational speed of the actuator.

7. The method as claimed in claim 1, further comprising determining a value for the power control for the actuator based upon the power control module from a value for a setpoint current of the actuator, a value for a power pilot control as the at least one pilot control parameter of the actuator, and a value for an actual current of the actuator.

8. The method as claimed in claim 1, further comprising supplying a value for an actual current which is applied to a motor of the actuator based upon a value for the power control of the actuator, as a result of which a value for an actual torque for the actuator is made available for a transmission of the actuator.

9. The method as claimed in claim 1, further comprising supplying a value for the power control for each actuator of each stabilizer arrangement, for operating the respective actuator, for a plurality of stabilizer arrangements, wherein, in each case, a stabilizer arrangement is assigned to one axle of the motor vehicle and wherein values for the power control for operating the actuators are determined comprehensively for the stabilizer arrangement.

* * * * *